(12) United States Patent
Meylan et al.

(10) Patent No.: US 8,880,104 B2
(45) Date of Patent: Nov. 4, 2014

(54) STANDBY TIME IMPROVEMENTS FOR STATIONS IN A WIRELESS NETWORK

(75) Inventors: Arnaud Meylan, San Diego, CA (US); Manoj M. Deshpande, San Diego, CA (US); Sanjiv Nanda, Ramona, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1063 days.

(21) Appl. No.: 11/680,302

(22) Filed: Feb. 28, 2007

(65) Prior Publication Data
US 2007/0297438 A1    Dec. 27, 2007

Related U.S. Application Data

(60) Provisional application No. 60/779,235, filed on Mar. 3, 2006, provisional application No. 60/779,824, filed on Mar. 7, 2006.

(51) Int. Cl.
*H04W 24/00* (2009.01)
*H04W 52/02* (2009.01)
*H04W 84/12* (2009.01)

(52) U.S. Cl.
CPC ............ *H04W 52/0225* (2013.01); *Y02B 60/50* (2013.01); *H04W 84/12* (2013.01); *H04W 52/0216* (2013.01)
USPC ........ 455/457; 455/127.5; 455/418; 370/445; 370/431; 370/311

(58) Field of Classification Search
CPC . H04W 52/00; H04W 52/0216; H04W 8/245; H04W 56/00; H04W 84/12; H03F 3/24
USPC ................ 455/343.1, 343.2, 343.5, 458, 522, 455/572–574, 13.4, 127.1, 127.5, 525, 418; 340/7.32–7.38; 370/311, 318, 338, 370/329, 445, 431, 312; 381/123, 80, 77
See application file for complete search history.

(56) References Cited

U.S. PATENT DOCUMENTS 6,067,297 A    5/2000  Beach
6,212,175 B1   4/2001  Harsch
(Continued)

FOREIGN PATENT DOCUMENTS

CN    1592439 A    3/2005
EP    1 511 335    3/2005
(Continued)

OTHER PUBLICATIONS

Jing Al et al: "A adaptive coordinated medium access control for wireless sensor networks" Computers and Communications, 2004. Proceedings. ISCC 2004. Ninth International Symposium on Alexandria, Egypt Jun. 28-Jul. 1, 2004, Piscataway, NJ USA, IEEE, vol. 1, Jun. 28, 2004, pps ISBN: 0-7803-8623-X.

(Continued)

*Primary Examiner* — Mahendra Patel
(74) *Attorney, Agent, or Firm* — Peng Zhu; Thomas A. Jolly

(57) ABSTRACT

Techniques to improve the standby time of a station in a wireless network are described. An access point may advertise or convey a maximum listen interval and/or an association timeout supported by that access point. A station may operate in a power-save mode and may wake up every listen interval to receive a beacon and any potential traffic for the station. The station may select a suitable listen interval based on the maximum listen interval. The station may be dormant for a longer duration than the listen interval and may become active at least once in every association timeout in order to keep the association with the access point alive. The access point may also send broadcast and multicast traffic that might be of interest to stations in the power-save mode less frequently and using a special indication message.

42 Claims, 7 Drawing Sheets

(56) References Cited

U.S. PATENT DOCUMENTS

| | | |
|---|---|---|
| 6,480,476 B1 * | 11/2002 | Willars .................... 370/311 |
| 6,504,819 B2 | 1/2003 | Fowler et al. |
| 6,622,251 B1 | 9/2003 | Lindskog et al. |
| 6,804,542 B1 * | 10/2004 | Haartsen ................. 455/574 |
| 7,010,300 B1 | 3/2006 | Jones et al. |
| 7,181,190 B2 * | 2/2007 | Abhishek et al. ........ 455/343.4 |
| 7,194,288 B2 * | 3/2007 | Lee et al. ................ 455/574 |
| 7,274,929 B1 | 9/2007 | Banginwar |
| 7,289,804 B2 * | 10/2007 | Kim ....................... 455/432.1 |
| 7,295,827 B2 * | 11/2007 | Liu et al. ................ 455/343.2 |
| 7,369,518 B2 * | 5/2008 | Lee ........................ 370/311 |
| 7,424,007 B2 * | 9/2008 | Meier et al. ............. 370/352 |
| 7,430,421 B2 * | 9/2008 | Park ....................... 455/456.1 |
| 7,440,781 B2 | 10/2008 | Beach et al. |
| 7,489,648 B2 | 2/2009 | Griswold |
| 7,505,795 B1 * | 3/2009 | Lim et al. ................ 455/574 |
| 7,515,569 B2 * | 4/2009 | Prasad .................... 370/338 |
| 7,593,417 B2 * | 9/2009 | Wang et al. ............. 370/428 |
| 7,769,414 B2 * | 8/2010 | Yoon et al. .............. 455/574 |
| 7,916,687 B2 | 3/2011 | Deshpande et al. |
| 8,064,411 B2 | 11/2011 | Ecclesine |
| 2003/0002465 A1 | 1/2003 | Glendining et al. |
| 2003/0093476 A1 | 5/2003 | Syed |
| 2003/0093530 A1 | 5/2003 | Syed |
| 2003/0112815 A1 | 6/2003 | Lee |
| 2003/0137970 A1 * | 7/2003 | Odman .................... 370/350 |
| 2004/0029586 A1 | 2/2004 | Laroia et al. |
| 2004/0072559 A1 | 4/2004 | Kakumaru et al. |
| 2004/0100973 A1 | 5/2004 | Prasad |
| 2004/0105401 A1 * | 6/2004 | Lee ........................ 370/311 |
| 2004/0214571 A1 * | 10/2004 | Hong ...................... 455/435.1 |
| 2004/0235336 A1 | 11/2004 | Brekosky et al. |
| 2004/0235536 A1 * | 11/2004 | Kim et al. ............... 455/574 |
| 2005/0043061 A1 | 2/2005 | Sato et al. |
| 2005/0049013 A1 * | 3/2005 | Chang et al. ............ 455/574 |
| 2005/0059406 A1 | 3/2005 | Thomson et al. |
| 2005/0085279 A1 | 4/2005 | Aoki |
| 2005/0122936 A1 * | 6/2005 | Son et al. ................ 370/331 |
| 2005/0128988 A1 | 6/2005 | Simpson et al. |
| 2005/0245215 A1 * | 11/2005 | Abhishek et al. ........ 455/127.5 |
| 2005/0254444 A1 | 11/2005 | Meier et al. |
| 2005/0288022 A1 | 12/2005 | Ryu et al. |
| 2006/0013256 A1 | 1/2006 | Lee et al. |
| 2006/0126533 A1 | 6/2006 | Wang |
| 2006/0140186 A1 | 6/2006 | LoGalbo et al. |
| 2007/0021155 A1 | 1/2007 | Yu et al. |
| 2007/0127478 A1 * | 6/2007 | Jokela et al. ............ 370/390 |
| 2007/0253399 A1 | 11/2007 | Deshpande et al. |
| 2009/0279449 A1 | 11/2009 | Kneckt et al. |
| 2010/0189021 A1 | 7/2010 | He et al. |
| 2012/0176949 A1 | 7/2012 | Meylan et al. |
| 2014/0064173 A1 | 3/2014 | Meylan |

FOREIGN PATENT DOCUMENTS

| | | |
|---|---|---|
| EP | 1 592 272 | 11/2005 |
| JP | H05323683 A | 12/1993 |
| JP | 2002319886 A | 10/2002 |
| JP | 2002368802 A | 12/2002 |
| JP | 2003529954 | 10/2003 |
| JP | 2004128949 A | 4/2004 |
| JP | 2004187002 A | 7/2004 |
| JP | 2004214865 A | 7/2004 |
| JP | 2004242187 A | 8/2004 |
| JP | 2004349971 A | 12/2004 |
| JP | 2005080287 A | 3/2005 |
| JP | 2005130436 A | 5/2005 |
| JP | 2006005577 A | 1/2006 |
| JP | 2006005630 A | 1/2006 |
| JP | 2007525128 A | 8/2007 |
| JP | 2007533276 | 11/2007 |
| KR | 20050025039 A | 3/2005 |
| TW | 200414707 | 8/2004 |
| WO | WO0060810 A1 | 10/2000 |
| WO | WO0072615 | 11/2000 |
| WO | 01/63842 | 8/2001 |
| WO | WO0169859 A1 | 9/2001 |
| WO | 02/37890 | 5/2002 |
| WO | 02/078258 | 10/2002 |
| WO | 03/025597 | 3/2003 |
| WO | WO2005002137 A1 | 1/2005 |
| WO | WO2005086379 | 9/2005 |
| WO | WO2005125252 A1 | 12/2005 |

OTHER PUBLICATIONS

International Search Report and Written Opinion—PCT/US2007/063190, International Search Authority—European Patent Office—Sep. 7, 2007.

European Search Report—EP12152876—Search Authority—Munich—Apr. 2, 2012.

European Search Report—EP11159984—Search Authority—Munich—Jul. 5, 2011.

European Search Report—EP11159986—Search Authority—Munich—May 16, 2011.

Taiwan Search Report—TW096107443—TIPO—Apr. 14, 2011.

European Search Report—EP12174765—Search Authority—Munich—Aug. 8, 2012.

* cited by examiner

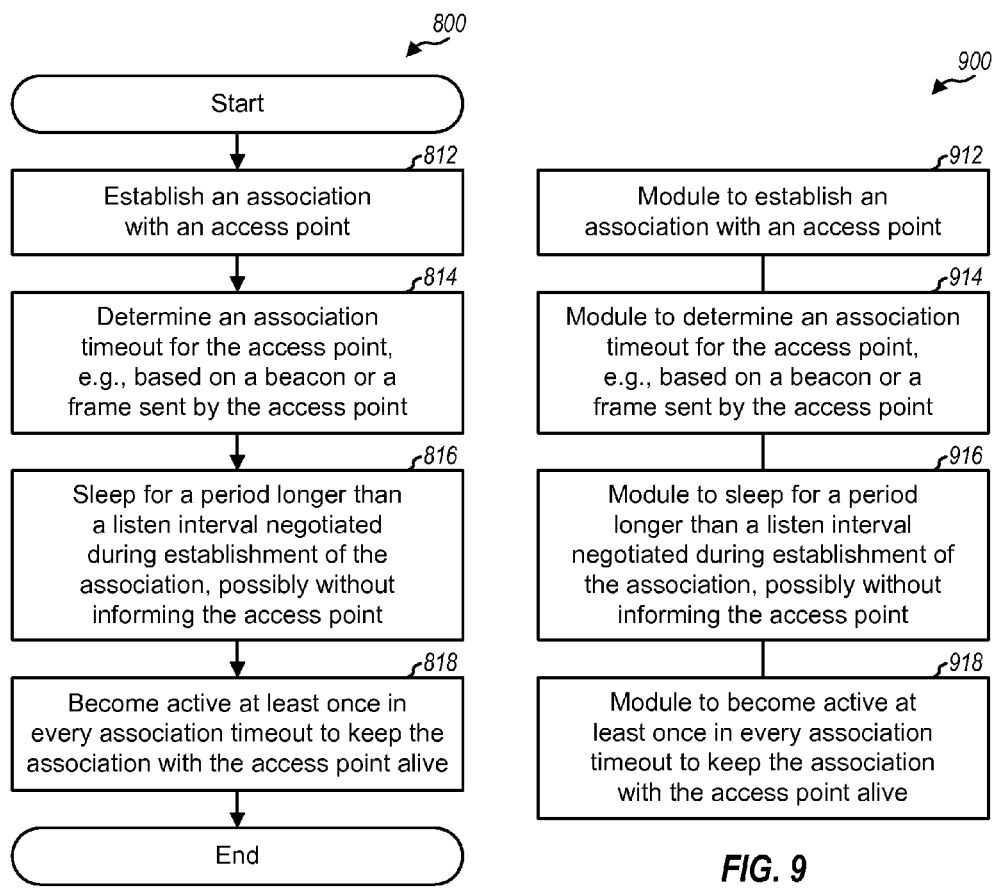

STANDBY TIME IMPROVEMENTS FOR STATIONS IN A WIRELESS NETWORK

The present application claims priority to provisional U.S. Application Ser. No. 60/779,235, entitled "STANDBY TIME IMPROVEMENTS FOR WLAN," filed Mar. 3, 2006, and provisional U.S. Application Ser. No. 60/779,824, entitled "STANDBY TIME IMPROVEMENTS FOR WLAN," filed Mar. 7, 2006, both assigned to the assignee hereof and incorporated herein by reference.

BACKGROUND

I. Field

The present disclosure relates generally to communication, and more specifically to techniques for improving standby time of a station in a wireless network.

II. Background

Wireless networks are widely deployed to provide various communication services such as voice, video, packet data, broadcast, messaging, etc. These wireless networks may be capable of supporting communication for multiple users by sharing the available network resources. Examples of such networks include wireless local area networks (WLANs), wireless metropolitan area networks (WMANs), wireless wide area networks (WWANs), and wireless personal area networks (WPANs). The terms "network" and "system" are often used interchangeably.

A wireless network may include any number of access points (APs) and any number of stations (STAs). An access point may act as a coordinator for communication with the stations. A station may actively communicate with an access point, may be idle, or may be powered down at any given moment depending on the data requirements of the station.

Standby time is an important selling point for portable devices that are battery powered. Current WLAN portable devices tend to have poor standby time performance in comparison to cellular phones. For example, the standby time for currently available WLAN Voice-over-IP (VOIP) phones typically ranges between 40 and 80 hours on batteries similar to those used in cellular phones. In comparison, cellular phones may be able to achieve 400 hours of standby time on similar batteries.

IEEE 802.11 is a family of standards developed by The Institute of Electrical and Electronics Engineers (IEEE) for WLANs. IEEE 802.11 defines a method for a station to sleep and thus save power. However, the efficiency of the method is limited for stations desiring very low power consumption because of signaling limitations in the standard as well as limited support by the access points and/or stations.

There is therefore a need in the art for techniques to improve the standby time of a station in a wireless network.

SUMMARY

Various techniques to improve the standby time of a station in a wireless network are described herein. In an aspect, an access point conveys a maximum listen interval supported by that access point, e.g., via a beacon or a unicast frame. The maximal listen interval for a given access point indicates the maximal time interval for which a given station may sleep when associated with that access point. The listen interval for a given station indicates how often that station may wake up to receive the beacon and potential traffic. A station may operate in a power-save mode and may wake up periodically to receive the beacon and any potential traffic for the station. The station may receive the maximum listen interval from an access point and may efficiently select a suitable listen interval for that station based on the maximum listen interval supported by the access point, without having to repeatedly negotiate different listen intervals with the access point. The station may also discover the maximum listen interval in other manners, as described below.

In another aspect, an access point conveys its association timeout to stations within its coverage. The association timeout is a duration of time in which the access point will keep an association for a station even when the station shows no activity during this time duration. The station may be dormant for longer than its listen interval in order to extend battery life. The station may obtain the association timeout of the access point and may ensure to be active at least once in every association timeout in order to keep the association with the access point alive.

In yet another aspect, an access point sends broadcast and multicast traffic that might be of interest to stations in the power-save mode (or PS-stations) in a manner such that these stations may achieve improved power saving. Such broadcast and multicast traffic may include traffic associated with managing network connectivity, network monitoring, etc. The access point may send (i) a Delivery Traffic Indication Message (DTIM) to indicate regular broadcast and multicast traffic being sent by the access point and (ii) a slow DTIM to indicate broadcast and multicast traffic of potential interest to the PS-stations. The slow DTIM may be sent at a slower rate than the DTIM. The PS-stations may listen for the slow DTIM and may sleep through the DTIM.

Various aspects and features of the disclosure are described in further detail below.

BRIEF DESCRIPTION OF THE DRAWINGS

FIG. 8 shows a process for avoiding association time out.

FIG. 9 shows an apparatus for avoiding association time out.

DETAILED DESCRIPTION

The power saving techniques described herein may be used for various wireless networks such as WLANs, WMANs, WWANs, WPANs, etc. A WLAN may implement a radio technology such as any defined by IEEE 802.11, Hiperlan, etc. A WWAN may be a cellular network such as a Code Division Multiple Access (CDMA) network, a Time Division Multiple Access (TDMA) network, a Frequency Division Multiple Access (FDMA) network, an Orthogonal FDMA (OFDMA) network, a Single-Carrier FDMA (SC-FDMA) network, etc. A WMAN may implement a radio technology such as any defined by IEEE 802.16 such as 802.16e, which is commonly referred to as WiMAX, or IEEE 802.20. A WPAN may implement a radio technology such as Bluetooth. For clarity, the techniques are described below for an IEEE 802.11 WLAN.

Figure 1:
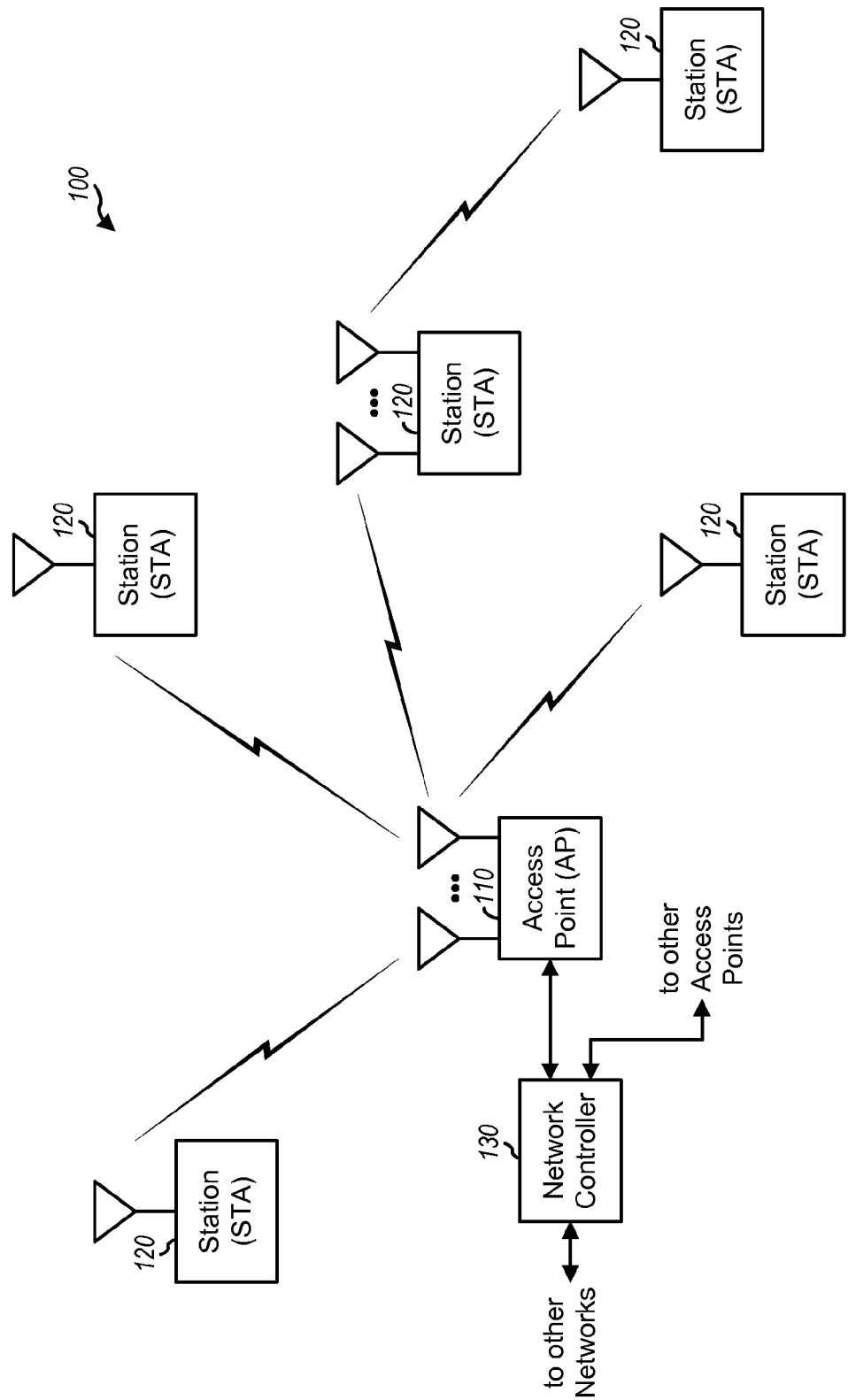
FIG. 1 shows a wireless network with an access point and multiple stations.

FIG. 1 shows a wireless network 100 with an access point (AP) 110 and multiple stations (STAs) 120. In general, a wireless network may include any number of access points and any number of stations. A station is a device that can communicate with another station via a wireless medium. The terms "wireless medium" and "channel" are often used interchangeably. A station may communicate with an access point or peer-to-peer with another station. A station may also be called, and may contain some or all of the functionality of, a terminal, a mobile station, a user equipment, a subscriber unit, etc. A station may be a cellular phone, a handheld device, a wireless device, a personal digital assistant (PDA), a laptop computer, a wireless modem, a cordless phone, etc. An access point is a station that provides access to distribution services via the wireless medium for stations associated with that access point. An access point may also be called, and may contain some or all of the functionality of, a base station, a base transceiver station (BTS), a Node B, an evolved Node B (eNode B), etc.

For a centralized network, a network controller 130 couples to the access points and provides coordination and control for these access points. Network controller 130 may be a single network entity or a collection of network entities. For a distributed network, the access points may communicate with one another as needed without the uses of network controller 130.

Wireless network 100 may implement the IEEE 802.11 family of standards. For example, wireless network 100 may implement IEEE 802.11, 802.11a, 802.11b, 802.11e and/or 802.11g, which are existing IEEE 802.11 standards. Wireless network 100 may also implement IEEE 802.11n and/or 802.11s, which are IEEE 802.11 standards being formed. IEEE 802.11, 802.11a, 802.11b, 802.11g and 802.11n cover different radio technologies and have different capabilities. IEEE 802.11e covers quality of service (QoS) enhancements for a Medium Access Control (MAC) layer. In IEEE 802.11e, a station that supports QoS facility is referred to as QSTA, and an access point that supports QoS facility is referred to as QAP. QoS facility refers to mechanisms used to provide parameterized and prioritized QoS.

A station may communicate with an access point for one or more flows. A flow is a higher layer data stream that is sent via a link. A flow may utilize Transmission Control Protocol (TCP), User Datagram Protocol (UDP), or some other protocol at a transport layer. A flow may also be referred to as a data stream, a traffic stream, etc. A flow may carry any type of data such as voice, video, packet data, etc. A flow may be for a particular traffic class and may have certain requirements on data rate, latency or delay, etc. A flow may be (a) periodic and sent at regular intervals or (b) non-periodic and sent sporadically, e.g., whenever there is data to send. A periodic flow is a flow in which data is sent at regular intervals. For example, a flow for VoIP may send a data frame every 10 or 20 milliseconds (ms). As used herein, a frame is a unit of transmission and may be a data frame, a null frame, a control frame, or some other type of frame. A frame may also be referred to as a packet, a data block, a data unit, a protocol data unit (PDU), a service data unit (SDU), a MAC PDU (MPDU), etc. A call for a station may have one or more flows for one or more traffic types.

Figure 2:
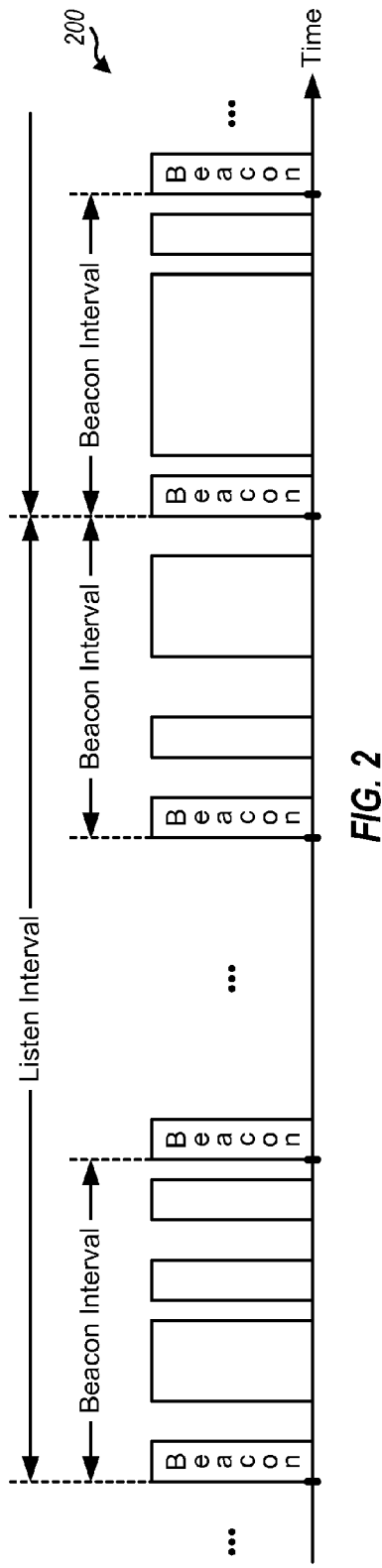
FIG. 2 shows an example transmission timeline for the access point.

FIG. 2 shows an example transmission timeline 200 for access point 110 in wireless network 100. In general, each access point in a wireless network may maintain a separate timeline for all transmissions covered by that access point. The transmission timeline for access point 110 is described below. Access point 110 periodically transmits a beacon on the downlink. This beacon carries a preamble and an access point identifier (AP ID) that allows the stations to detect and identify the access point. The time interval between the start of two consecutive beacons is called a target beacon transmit time (TBTT) or a beacon interval. The beacon interval may be fixed or variable and may be set to a suitable duration, e.g., 100 ms.

Each beacon interval may include any number of service periods for any number of stations. A service period is a contiguous time duration during which an access point may transmit one or more downlink frames to a station and/or may grant one or more transmission opportunities (TXOPs) to the same station. A TXOP is an allocation of time for transmission on a link. A service period may be scheduled or unscheduled. A given station may have any number of service periods within a given beacon interval.

A station typically performs association procedures to associate with an access point when the station is first powered up or moves into a new WLAN coverage area. Association refers to the mapping of a station to an access point, which enables the station to receive distribution service. The association allows the distribution service to know which access point to contact for the station. The station attempts to disassociate whenever it leaves the network. The station performs reassociation procedures to "move" a current association from one access point to another access point. The association, disassociation, and reassociation procedures are described in IEEE 802.11 documents.

A station typically performs negotiation with an access point for various features or attributes such as security, Internet Protocol (IP) address, QoS, flows, power management, etc. The negotiation typically entails exchanging request and response frames between the station and the access point until pertinent parameter values are agreed upon between the station and the access point. Thereafter, the station operates in accordance with the states or context defined by the parameters negotiated with the access point.

IEEE 802.11 defines a power-save (PS) mode for stations desiring to conserve battery power. A station that desires to operate in the power-save mode indicates this intention to an access point by setting a "PS-mode" bit to 1 in a MAC header of a transmission sent to the access point. A station that is in the power-save mode is referred to as a PS-station. In response, the access point recognizes that the station will be sleeping and will wake up only at agreed upon times to receive traffic. The access point then buffers any incoming traffic data for the station and delivers the data to the station when the station is awake.

A station that is in the power-save mode may choose to wake up to receive a Traffic Indication Map (TIM) and/or a Delivery Traffic Indication Message (DTIM). The TIM is a bitmap that is present in every beacon transmitted by an access point. The TIM in a given beacon indicates to the station whether there is pending unicast traffic for that station in the upcoming beacon interval. At the time of association, the station and the access point negotiate a listen interval that indicates how often the station will wake up to listen for beacon and hence receive the TIM. The listen interval is typically multiple times the beacon interval, as shown in FIG. 2. For example, if the station has a listen interval of five, then the station may wake up at every fifth beacon to decode the TIM and receive potential traffic for that station.

The DTIM is a bitmap that indicates whether broadcast and multicast traffic is being delivered in the upcoming beacon interval. The DTIM is sent at an interval that is selected by the access point. The DTIM interval is typically multiple times the beacon interval and is fixed for a Basic Service Set (BSS), which is a network of stations associated to the access point. A station that is willing to receive broadcast or multicast traffic would decode the DTIM independently of the listen interval for that station.

An access point may select a DTIM interval based on a tradeoff between latency, buffer size requirements, and power saving. Similarly, a station that is in the power-save mode may select a listen interval as well as whether or not to wake for the DTIM based on a tradeoff between latency, buffer size requirements, and power saving.

In general, a longer listen interval provides more power saving for a station in the power-save mode but results in more delay, which may be tolerable for some types of traffic. Hence, the station may request a large listen interval at the time of association with an access point if the station favors power saving. However, a larger listen interval results in larger buffer size requirements for the access point to store potential incoming traffic for all stations supported by that access point. Supporting a large listen interval is thus a constraint for the access point because the buffers used for storing potential incoming traffic should be sized according to the amount of data that might be received during the listen interval for all stations supported by the access point.

IEEE 802.11 does not impose a requirement on the maximum listen interval that an access point needs to support. An access point may support listen intervals within a particular range, e.g., from 1 to 20 times the beacon interval, or possibly more. The supported listen interval range may be dependent on various factors such as the capability of the access point, the number of stations being served by the access point, the number of stations in the power-save mode, etc. Different access points from different vendors may support different ranges of listen intervals. Furthermore, the maximum listen interval supported by a given access point may change over time, e.g., depending on the number of stations that are in the power-save mode with that access point. Conventionally, a station has no easy way of knowing the maximum listen interval supported by an access point.

In an aspect, an access point conveys the maximum listen interval supported by that access point, and a station uses this information to more efficiently select a suitable listen interval. In one design, the access point advertises the maximum listen interval in the beacon. A beacon frame includes various information elements carrying various types of information. An information element may be defined for maximum listen interval and may be included in a beacon frame sent by the access point.

Figure 3:
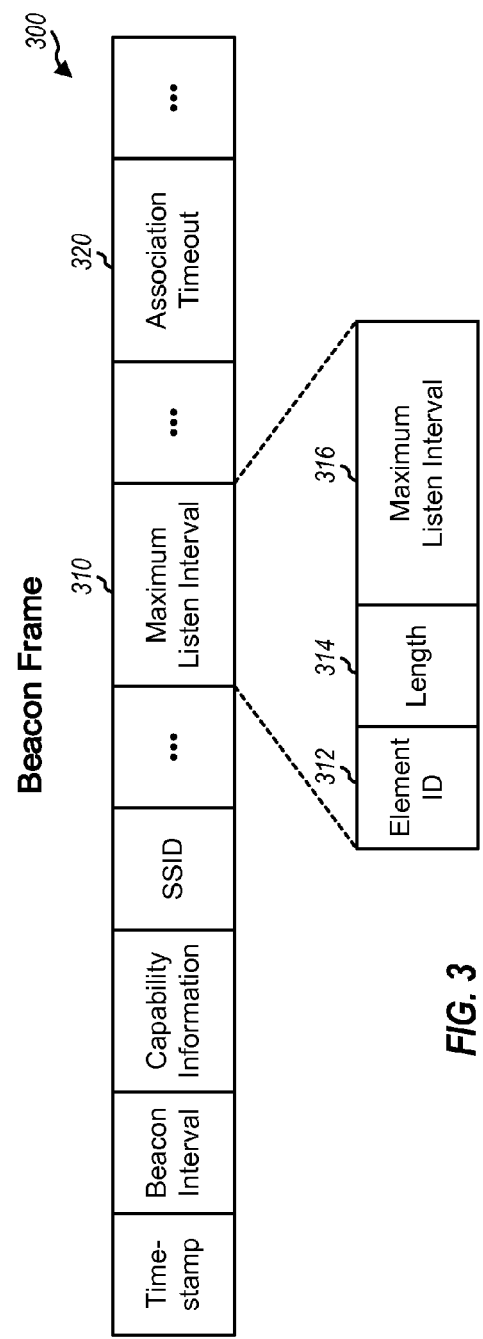
FIG. 3 shows a design of a beacon frame.

FIG. 3 shows a design of a beacon frame 300 that may be transmitted by an access point. Beacon frame 300 includes a Timestamp field that indicates the timing of the access point, a Beacon Interval field that indicates the time duration between beacons, a Capability Information field that indicates the requested or advertised capabilities of the access point, a Service Set Identity (SSID) field that carries an identifier for the WLAN, and other information elements defined by IEEE 802.11. In the design shown in FIG. 3, beacon frame 300 includes a Maximum Listen Interval information element 310. Information element 310 includes an Element ID field 312 that is set to a unique value assigned to information element 310, a Length field 314 that indicates the length of subsequent field 316, and field 316 that carries the maximum listen interval supported by the access point.

A station may listen for a beacon frame upon power up or moving into a new WLAN coverage area. The station may then determine the maximum listen interval supported by the access point. If the station desires to maximize its power saving, then the station may select the maximum listen interval advertised by the access point. The station may also select a shorter listen interval based on its traffic requirements. In any case, the station is able to select and include a suitable listen interval in the first association request sent to the access point.

In another design, an access point conveys the maximum listen interval that it supports in a unicast frame sent to a station. An information element may be defined for maximum listen interval and may be included in a frame sent by the access point to the station. In one scheme, the maximum listen interval is conveyed during system access. A station may send a probe request to an access point. The access point may include the maximum listen interval supported by that access point in a probe response sent to the station, e.g., if the "PS-mode" bit is set to 1. In another scheme, the maximum listen interval is conveyed during association. A station may select a listen interval desired by the station and include the selected listen interval in the first association request sent to the access point. If the selected service interval is not supported by the access point, then the access point may send an association response that includes the maximum listen interval supported by the access point. The station may then select a suitable listen interval and include it in the next association request.

An access point may also convey the maximum listen interval supported by that access point in other manners. A station may determine the maximum listen interval based on a beacon, a probe response, an association response, or some other transmission. The station may then select a suitable listen interval without or with little guesswork and may save power in the association procedure.

Figure 4:
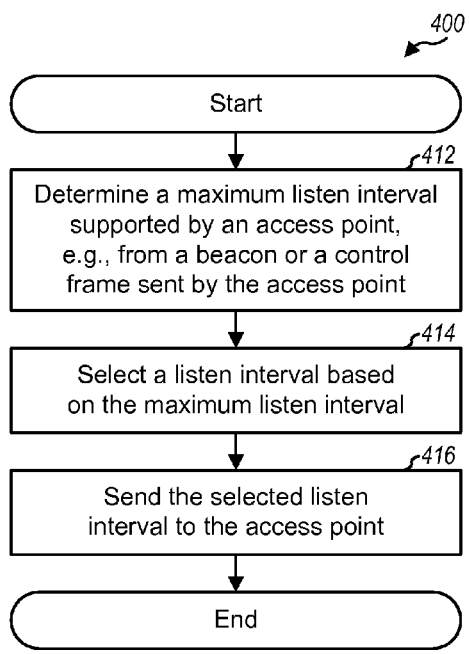
FIG. 4 shows a process for negotiating a listen interval.

FIG. 4 shows a process 400 for negotiating a listen interval. A station initially determines a maximum listen interval supported by an access point (block 412). The station may obtain the maximum listen interval from a beacon, a control frame sent in a probe response or an association response, or some other transmission sent by the access point. The station then selects a listen interval based on the maximum listen interval (block 414). For example, the selected listen interval may be equal to the maximum listen interval if the station desires to maximize power saving and its traffic can tolerate the delay. The station then sends the selected listen interval to the access point (block 416).

Figure 5:
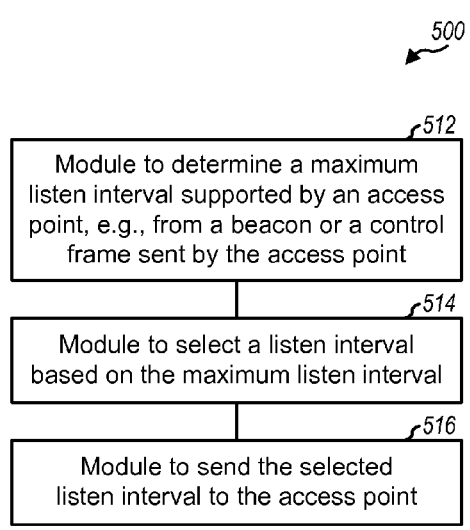
FIG. 5 shows an apparatus for negotiating a listen interval.

FIG. 5 shows a design of an apparatus 500 for negotiating a listen interval. Apparatus 500 includes means for determining a maximum listen interval supported by an access point (module 512), means for selecting a listen interval based on the maximum listen interval (module 514), and means for sending the selected listen interval to the access point (module 516). Modules 512 to 516 may comprise processors, electronics devices, hardware devices, electronics components, logical circuits, memories, etc., or any combination thereof.

A station may also determine the maximum listen interval supported by an access point in other manners. The station may send one or more requests to determine the maximum listen interval supported by the access point. If a large listen interval is desired, then the station may try one or more listen intervals at association time until the access point accepts one of the listen intervals. The station may request the largest listen interval in the first association request sent to the access point. If the requested listen interval is too large, then the access point may simply respond with an error status code in an association response, e.g., a status code of 51 for "Association denied because the listen interval is too large". The status code in the response does not convey to the station the largest listen interval supported by the access point. Hence, the station may then request a smaller listen interval in the next association request sent to the access point. The station may request progressively smaller listen intervals until a requested listen interval is within the range supported by the access point.

The station may also send the requests for listen intervals in other orders. For example, the station may send a request for a listen interval of N. If that listen interval is supported, then the station may send a request for a larger listen interval, e.g., N+1. Otherwise, the station may send a request for a smaller listen interval, e.g., N−1. The station may repeat sending requests until the maximum listen interval is discovered and may then use it.

In general, a station may determine the maximum listen interval supported by an access point in a heuristic manner. The station may send multiple requests for multiple listen interval values until the station receives a response accepting one of the requests and another response denying another one of the requests. The station may send one request for one listen interval value at a time. The station may start with a request for a largest listen interval value and conclude with a request for a smallest listen interval value, until the response accepting one of the requests is received. The station may also start with a request for a smallest listen interval value and conclude with a request for a largest listen interval value, until the response denying one of the requests is received. The station may also start with a request for a middle listen interval value, send a request for a larger listen interval value if a response accepting the request is received, and send a request for a smaller listen interval value if a response denying the request is received. The station may also send the requests in other orders. The station may determine a suitable listen interval for use based on the received responses.

A station typically negotiates an appropriate listen interval when it associates with an access point. The station thereafter uses the negotiated listen interval for the entire duration of the association with the access point. The negotiated listen interval may be inadequate or undesirable for various reasons, and the station may desire to select a more suitable listen interval. In this case, the station would disassociate with the access point and then reassociate with the same access point. The station may negotiate a more suitable listen interval during the reassociation with the access point. The current IEEE 802.11 standard does not provide a mechanism for updating the listen interval while a station is associated with an access point.

In another aspect, a station renegotiates the listen interval on the fly without having to disassociate and reassociate with an access point. This capability may provide certain advantages, as described below.

Figure 6:
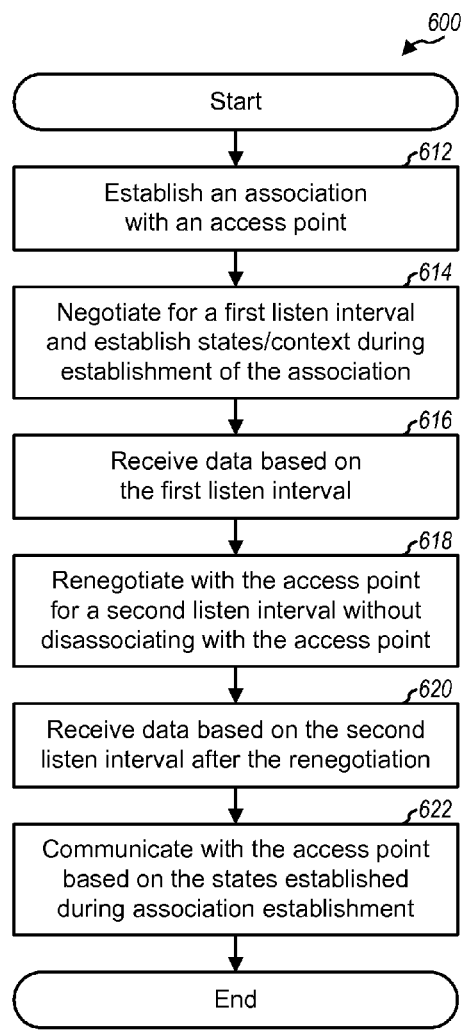
FIG. 6 shows a process for renegotiating the listen interval on the fly.

FIG. 6 shows a process 600 for a station to renegotiate the listen interval on the fly. The station initially establishes an association with an access point (block 612). The station negotiates a first listen interval and establishes states or context (e.g., for security, IP address, QoS, power management, etc.) during establishment of the association (block 614). The station thereafter receives data based on the first listen interval and the established states (block 616).

The station thereafter determines that the first listen interval is insufficient for whatever reason. The station then renegotiates with the access point for a second listen interval without disassociating with the access point (block 618). The second listen interval may be shorter or longer than the first listen interval, depending on the requirements of the station. The station may select the second listen interval with or without knowledge of the maximum listen interval supported by the access point. For the renegotiation, the station may send to the access point a control frame with the second listen interval. The access point may grant or deny the request by the station. If the request is granted, then the access point may send a response (e.g., an acknowledgement) indicating that the request is granted. The station receives the response and thereafter receives data based on the second listen interval (block 620). If the access point denies the second listen interval, then the station and the access point may continue negotiation until a suitable listen interval is selected and accepted.

In one design, the states or context (e.g., for security, IP address, QoS, power management, etc.) are retained for the station, and only the listen interval is changed during the renegotiation. In this design, the station thereafter communicates with the access point based on the states/context established earlier during association establishment (block 622). In another design, one or more parameters may also be renegotiated and modified either in the control frame carrying the second listen interval sent by the station or in one or more subsequent frames.

Figure 7:
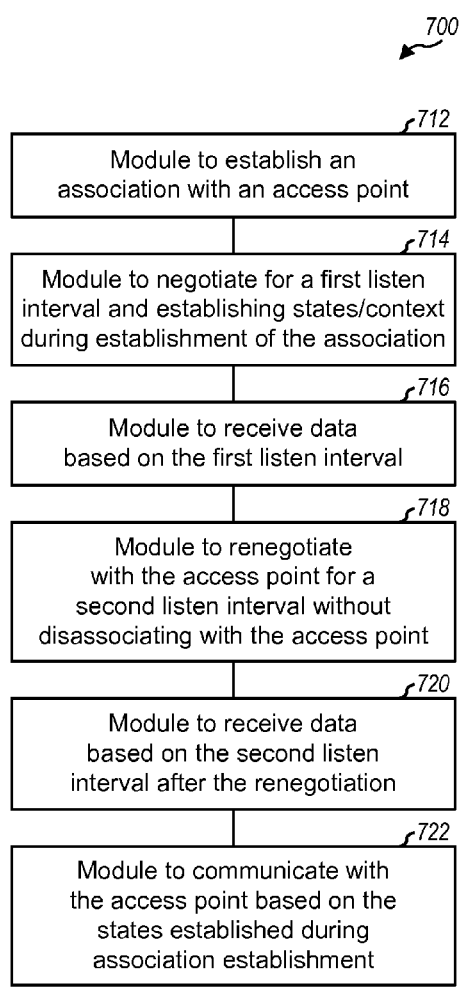
FIG. 7 shows an apparatus for renegotiating the listen interval on the fly.

FIG. 7 shows a design of an apparatus 700 for renegotiating the listen interval on the fly. Apparatus 700 includes means for establishing an association with an access point (module 712), means for negotiating a first listen interval and establishing states or context during establishment of the association (module 714), means for receiving data based on the first listen interval and the established states (module 716), means for renegotiating with the access point for a second listen interval without disassociating with the access point (module 718), means for receiving data based on the second listen interval (module 720), and means for communicating with the access point based on the states/context established earlier during association establishment (module 722). Modules 712 to 722 may comprise processors, electronics devices, hardware devices, electronics components, logical circuits, memories, etc., or any combination thereof.

In one design, new frames that are not currently in IEEE 802.11 are defined and used for sending a request for a new listen interval and a response to this request. In another design, new information elements are defined and included in existing frames to request for a new listen interval and to respond to the request.

A station may be dormant for an extended duration that is longer than the maximum listen interval supported by an access point. In this case, entities operating above Layer 2 in the network may buffer traffic for the station and synchronize delivery from a page buffering function (PBF) to the station. The traffic buffering may thus occur upstream of the access point. The PBF may be synchronized with the station and may send traffic for the station such that the traffic reaches the access point shortly before the station wakes up at the start of the next listen interval and decodes the TIM in the beacon. The access point does not need to be aware of the extended dormancy by the station. The access point may operate in a normal manner as if the station is waking up every listen interval to decode the TIM. However, the station may wake up at a multiple of the listen interval, which is synchronized with the PBF. The longer actual listen interval may allow the station to save more power. The PBF may ensure that traffic is sent when the station is awake to receive it.

When a station wakes up at a rate that is less frequent than the listen interval and an access point does not have this knowledge, there is a risk that the access point may disassociate the station if the access point does not detect any activity from the station for an extended period of time. If the access point disassociates the station, then the states/context for the station may be lost. The station may need to perform reassociation procedures in order to re-establish the states/context with the access point. This is undesirable since the reassociation procedures consume time and power.

In yet another aspect, an access point conveys its association timeout to the stations, and a station may use this information to avoid being timed out by the access point. In one design, the access point advertises its association timeout in the beacon. Referring to the design shown in FIG. 3, beacon frame 300 includes an Association Timeout information element 320 that includes the association timeout for the access point. The access point may set this information element to the current value of the association timeout used by the access point. In another design, the access point conveys the association timeout in a unicast frame, e.g., for a probe response or an association response.

A station that is dormant for longer than the negotiated listen interval with an access point may obtain the association timeout of the access point. The station may then ensure to be active at least once in every association timeout in order to keep the association with the access point alive. Correspondingly, the access point may ensure to keep the station associated for at least the advertised association timeout duration, even when the station shows no activity.

FIG. 8 shows a process 800 for a station to avoid association time out, e.g., due to extended dormancy. The station initially establishes an association with an access point (block 812). The station determines an association timeout for the access point, e.g., based on a beacon or a frame sent by the access point (block 814). The station may negotiate with the access point for a listen interval during establishment of the association. The station may sleep for a period longer than the listen interval, possibly without informing the access point (block 816). The station becomes active at least once in every association timeout to keep the association with the access point alive (block 818).

FIG. 9 shows a design of an apparatus 900 for avoiding association time out. Apparatus 900 includes means for establishing an association with an access point (module 912), means for determining an association timeout for the access point, e.g., based on a beacon or a frame sent by the access point (module 914), means for sleeping for a period longer than a listen interval negotiated during establishment of the association, possibly without informing the access point (module 916), and means for becoming active at least once in every association timeout to keep the association with the access point alive (module 918). Modules 912 to 918 may comprise processors, electronics devices, hardware devices, electronics components, logical circuits, memories, etc., or any combination thereof.

An access point may advertise the maximum listen interval and/or the association timeout supported by that access point in the beacon, as described above. The maximum listen interval and/or the association timeout may be received by, and applied to, all stations within the coverage of the access point. The access point may also convey the maximum listen interval and/or the association timeout in unicast frames sent to specific stations. The access point may use different maximum listen intervals and/or different association timeouts for different stations, different access categories, etc. For example, a longer listen interval and/or a longer association timeout may be used for a station with higher priority. Conversely, a shorter listen interval and/or a shorter association timeout may be used for a station with lower priority. Individual listen interval and/or association timeout for a specific station may be conveyed in the beacon or unicast frames.

The current IEEE 802.11 standard supports power save for a station and groups traffic into two categories:
  Broadcast and multicast traffic indicated by the DTIM, and
  Unicast traffic sent in directed frames to the station after the presence of the traffic is indicated in the beacon's TIM at every listen interval.

A station may desire to receive broadcast or multicast traffic (e.g., audio, streaming video, etc.) from an application layer. The station may then wake up a sufficient amount of time in order to receive these traffic streams. The station is likely not a candidate for deep sleep and significant power-save operation because the DTIM may be sent often, e.g., every beacon.

Conventionally, the broadcast and multicast traffic indicated by the DTIM includes (1) broadcast and multicast traffic from the application layer, which is referred to herein as "application" broadcast and multicast traffic, and (2) broadcast and multicast traffic associated with managing network connectivity, network monitoring, etc., which is referred to herein as "network" broadcast and multicast traffic. Some examples of network broadcast and multicast traffic include Address Resolution Protocol (ARP) traffic, Dynamic Host Configuration Protocol (DHCP) traffic, topology updates, and other such types of traffic. ARP is used to map MAC addresses to IP addresses. DHCP is used for dynamic IP configuration. A station may desire to receive network broadcast and multicast traffic even when the station intends to be idle and operating in deep sleep.

Conventionally, both application and network broadcast and multicast traffic are included together and sent using the DTIM mechanism. An idle station that desires to save power will likely not be interested in receiving the application broadcast and multicast traffic. Otherwise, the station may have its display, keypad, and processor turned on, and therefore may not be saving much power anyway. However, the idle terminal may desire to ensure that its connectivity for Layer 2 and above is operational. For example, the station may desire to respond to ARP requests, possible DHCP messages, etc. These messages are also broadcast traffic and are thus sent using the DTIM.

The DTIM indicates both (a) network broadcast and multicast traffic used to maintain Layer 2 and above connectivity and (b) application broadcast and multicast traffic. Hence, a station that is interested in receiving only network broadcast and multicast traffic would need to wake up for each DTIM in order to receive potential network broadcast and multicast traffic. The DTIM is typically sent in every beacon (or every few beacons) in order to reduce the delay of the application broadcast and multicast traffic. In this case, the station may need to wake up at each beacon for the DTIM, which may severely impact power save performance.

In yet another aspect, an access point sends network broadcast and multicast traffic in a manner to improve power saving for stations in the power-save mode. A new service access point (SAP) may be made available for a new broadcast and multicast traffic class that is associated with stations in the power-save mode. This traffic class may be referred to as Power Save (PS) broadcast and multicast traffic and may include network broadcast and multicast traffic and/or other broadcast and multicast traffic that might be of interest to stations in the power-save mode.

A new DTIM may also be made available and may be referred to as a SlowDTIM or slow DTIM. The PS broadcast and multicast traffic may be sent using the SlowDTIM. The SlowDTIM may be sent at every SlowDTIM interval, which is a predetermined number of beacon intervals. The SlowDTIM interval may be larger than the DTIM interval and may be selected based on a tradeoff between power saving and messaging delay. For example, the SlowDTIM may be sent in every 2, 3, 4, or some other multiple of the DTIM.

Traffic relevant to maintaining Layer 2 and above connectivity and/or other types of PS broadcast and multicast traffic may be sent using the SlowDTIM. The PS broadcast and multicast traffic may also be copied and sent using the DTIM so that stations that do not receive the SlowDTIM can also receive this traffic. Application broadcast and multicast traffic is not sent using the SlowDTIM and is instead sent using the DTIM.

A station in the power-save mode may be able to maintain Layer 2 and above connectivity by listening to the SlowDTIM and receiving network broadcast and multicast traffic used to maintain network connectivity. The station may sleep through the DTIM, which may be sent at a shorter interval or a faster rate. The SlowDTIM may improve power saving for the station.

In one design, the SlowDTIM is sent every N DTIM, where N may be any integer greater than one. In this design, a station in the power-save mode may wake up at each listen interval as well as for each SlowDTIM. In another design, the SlowDTIM is sent in a manner to reduce the number of times that power-save stations need to wake up. For example, the SlowDTIM may be sent in each listen interval for a station or a group of stations having the same listen interval. A station may then receive the SlowDTIM and the TIM from the same beacon in each listen interval.

A station may desire deep sleep and may select a listen interval that is much longer than the SlowDTIM interval. In one design, to avoid requiring the station to wake up at each SlowDTIM interval, the network broadcast and multicast traffic may be sent directly to the station in unicast frames. The station may then receive the network broadcast and multicast traffic when the station wakes up for its listen interval. The station and the access point may configure this mode of traffic delivery, e.g., during configuration setup for the power-save mode. This traffic delivery mode may be selectively applied to stations desiring deep sleep and may be readily supported by the access point when the network broadcast and multicast traffic is segregated from the application broadcast and multicast traffic.

Figure 10:
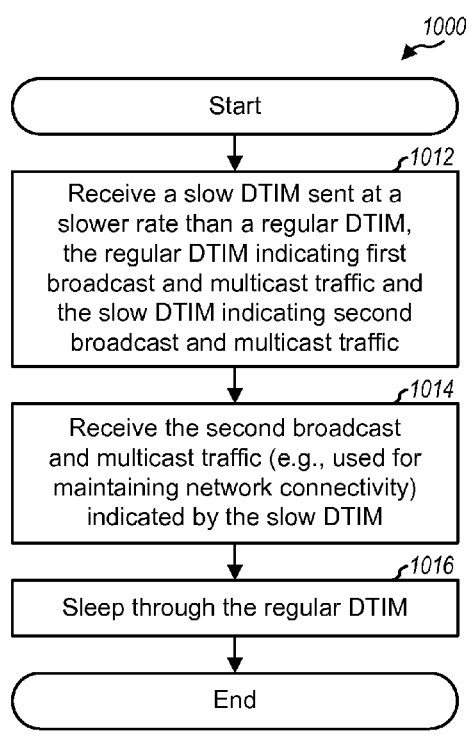
FIG. 10 shows a process for receiving broadcast and multicast traffic in the power-save mode.

FIG. 10 shows a process 1000 for receiving broadcast and multicast traffic by a station in the power-save mode. The station receives a slow DTIM sent at a slower rate than a regular DTIM, with the regular DTIM indicating first broadcast and multicast traffic and the slow DTIM indicating second broadcast and multicast traffic. (block 1012). The first broadcast and multicast traffic may comprise network broadcast and multicast traffic, application broadcast and multicast traffic, and/or other broadcast and multicast traffic for a WLAN. The second broadcast and multicast traffic may comprise network broadcast and multicast traffic and/or other broadcast and multicast traffic that might be interest to stations in the power-save mode. The station receives the second broadcast and multicast traffic (e.g., used for maintaining network connectivity) as indicated by the slow DTIM (block 1014). The slow DTIM may be sent in every N regular DTIM, in every listen interval for the station, etc. The station may sleep through the regular DTIM (block 1016).

Figure 11:
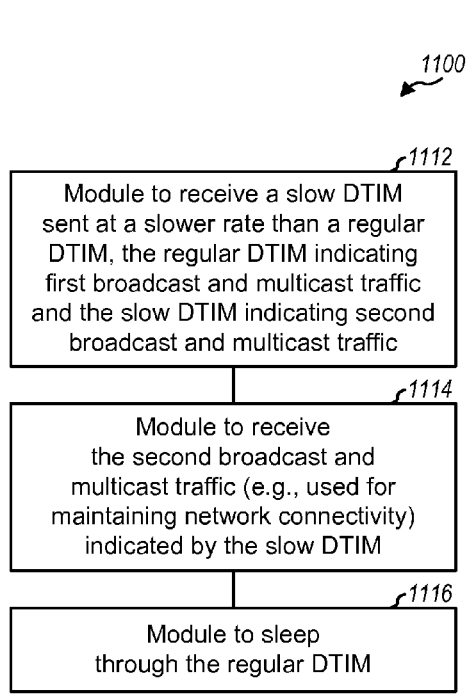
FIG. 11 shows an apparatus for receiving broadcast and multicast traffic in the power-save mode.

FIG. 11 shows a design of an apparatus 1100 for receiving broadcast and multicast traffic in the power-save mode. Apparatus 1100 includes means for receiving a slow DTIM sent at a slower rate than a regular DTIM, with the regular DTIM indicating first broadcast and multicast traffic and the slow DTIM indicating second broadcast and multicast traffic (module 1112), means for receiving the second broadcast and multicast traffic (e.g., used for maintaining network connectivity), as indicated by the slow DTIM (module 1114), and means for sleeping through the regular DTIM (module 1116). Modules 1112 to 1116 may comprise processors, electronics devices, hardware devices, electronics components, logical circuits, memories, etc., or any combination thereof.

Figure 12:
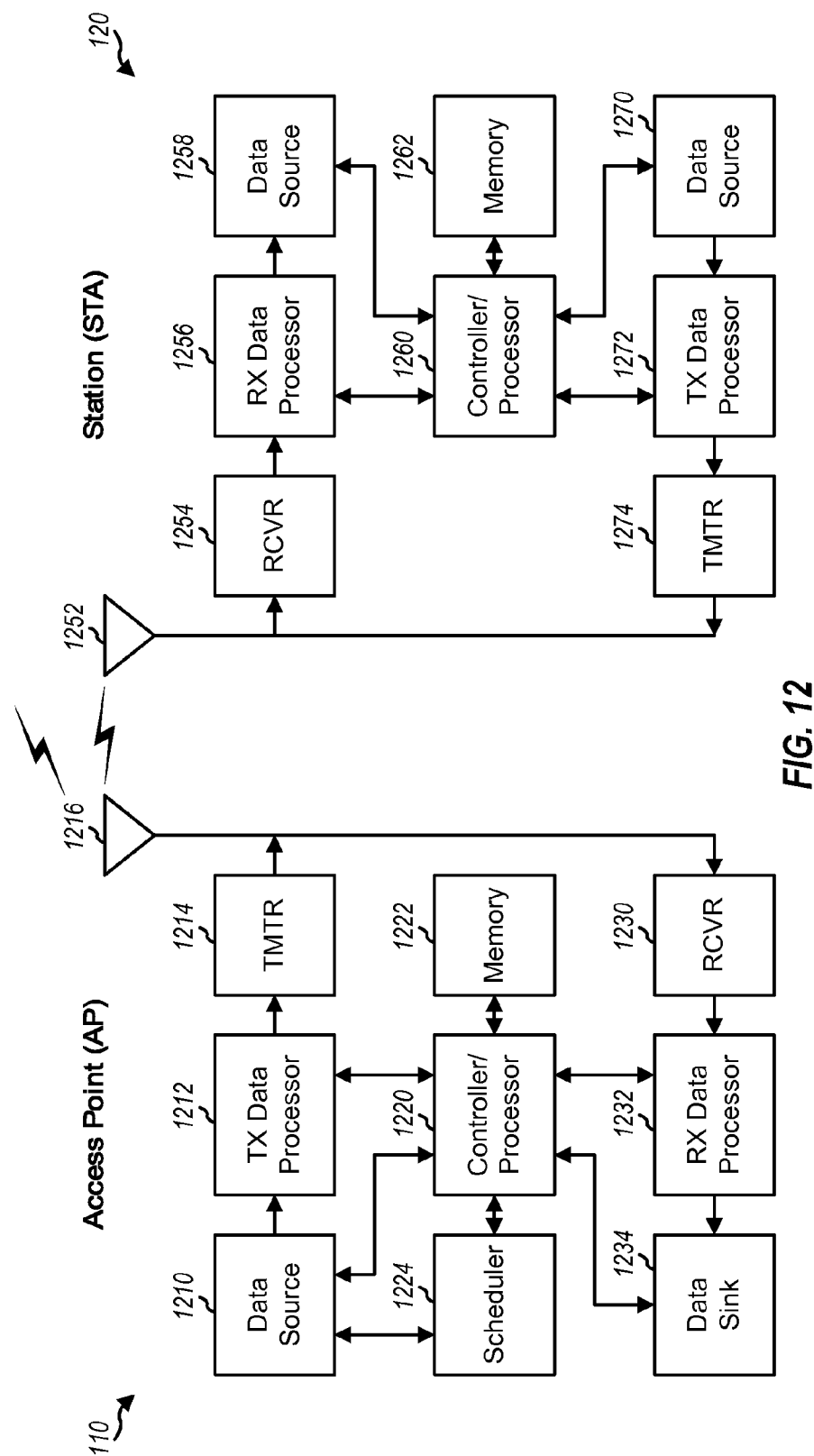
FIG. 12 shows a block diagram of an access point and a station.

FIG. 12 shows a block diagram of access point 110 and station 120, which may be one of the stations in FIG. 1. On the downlink, at access point 110, a transmit (TX) data processor 1212 receives traffic data from a data source 1210 for the stations scheduled for transmission, control data (e.g., the maximum listen interval, association timeout, response frames, etc.) from a controller/processor 1220, and scheduling information (e.g., TIM, DTIM, slow DTIM, etc.) from a scheduler 1224 via controller/processor 1220. TX data processor 1212 processes (e.g., encodes, interleaves, modulates, and scrambles) the traffic data for each station based on a rate selected for that station, processes the control data and scheduling information, and generates data chips. A transmitter (TMTR) 1214 processes (e.g., converts to analog, amplifies, filters, and upconverts) the data chips and generates a downlink signal, which is transmitted via an antenna 1216 to the stations.

At station 120, an antenna 1252 receives the downlink signal from access point 110 and provides a received signal. A receiver (RCVR) 1254 processes the received signal and provides samples. A receive (RX) data processor 1256 processes (e.g., descrambles, demodulates, deinterleaves, and decodes) the samples, provides decoded data for station 120 to a data sink 1258, and provides control data and scheduling information to a controller/processor 1260.

On the uplink, at station 120, a TX data processor 1272 receives traffic data from a data source 1270 and control data (e.g., listen interval, request frames, etc.) from controller/processor 1260. TX data processor 1272 processes the traffic and control data based on a rate selected for the station and generates data chips. A transmitter 1274 processes the data chips and generates an uplink signal, which is transmitted via antenna 1252 to access point 110.

At access point 110, antenna 1216 receives the uplink signals from the station 120 and other stations. A receiver 1230 processes a received signal from antenna 1216 and provides samples. An RX data processor 1232 processes the samples and provides decoded data for each station to a data sink 1234 and provides control data to controller/processor 1220.

Controllers/processors 1220 and 1260 direct operation at access point 110 and station 120, respectively. Scheduler 1224 may perform scheduling for the stations and may also perform scheduling for broadcast and multicast traffic sent using the DTIM and slow DTIM. Scheduler 1224 may reside at access point 110, as shown in FIG. 12, or at another network entity.

The power saving techniques described herein may be implemented by various means. For example, these techniques may be implemented in hardware, firmware, software, or a combination thereof. For a hardware implementation, the processing units used to perform the techniques at a station may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. The processing units used to perform the techniques at an access point may be implemented within one or more ASICs, DSPs, processors, etc.

For a firmware and/or software implementation, the power saving techniques may be implemented with modules (e.g., procedures, functions, etc.) that perform the functions described herein. The firmware and/or software codes may be stored in a memory (e.g., memory 1222 or 1262 in FIG. 12) and executed by a processor (e.g., processor 1220 or 1260). The memory may be implemented within the processor or external to the processor.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An apparatus comprising:
    a processor configured to send a plurality of requests for a plurality of listen interval values, to receive a response accepting one of the plurality of requests, to receive another response denying another one of the plurality of requests, and to determine a listen interval for use based on the received responses; and
    a memory coupled to the processor;
    wherein the listen interval is not determined until both the response accepting one of the plurality of requests and the response denying another one of the plurality of requests are received.

2. The apparatus of claim 1, wherein the processor is configured to send one request for one listen interval value at a time until the response accepting one of the plurality of requests and the response denying another one of the plurality of requests are both received.

3. The apparatus of claim 1, wherein the processor is configured to send one request for one listen interval value at a time, starting with a request for a largest listen interval value and concluding with a request for a smallest listen interval value, until the response accepting one of the plurality of requests is received.

4. The apparatus of claim 1, wherein the processor is configured to send one request for one listen interval value at a time, starting with a request for a smallest listen interval value and concluding with a request for a largest listen interval value, until the response denying another one of the plurality of requests is received.

5. An apparatus comprising:
    a processor configured to establish an association with an access point, to receive data based on a first listen interval negotiated with the access point during establishment of the association, to renegotiate with the access point for a modified listen interval without disassociating with the access point, and to receive data based on the modified listen interval after the renegotiation; and
    a memory coupled to the processor;
    wherein renegotiating with the access point for the modified listen interval comprises sending a request for a second listen interval to the access point, receiving a denial of the second listen interval from the access point, and continuing negotiation with the access point after the denial until a suitable listen interval is selected and accepted.

6. The apparatus of claim 5, wherein the processor is configured to establish states during the establishment of the association and to retain the states during the renegotiation for the modified listen interval.

7. The apparatus of claim 5, wherein the processor is configured to send a control frame with the second listen interval to the access point.

8. The apparatus of claim 5, wherein the processor is configured to wake up for beacon frames determined by the first listen interval or the modified listen interval and to sleep between the beacon frames when no data is sent to the apparatus.

9. A method comprising:
    establishing an association with an access point;
    receiving data based on a first listen interval negotiated with the access point during establishment of the association;
    renegotiating with the access point for a modified listen interval without disassociating with the access point, wherein renegotiating with the access point for the modified listen interval comprises sending a request for a second listen interval to the access point, receiving a denial of the second listen interval from the access point, and continuing negotiation with the access point after the denial until a suitable listen interval is selected and accepted; and
    receiving data based on the modified listen interval after the renegotiation.

10. The method of claim 9, further comprising:
    establishing states during establishment of the association; and
    retaining the states during the renegotiation for the modified listen interval.

11. An apparatus comprising:
    means for establishing an association with an access point;
    means for receiving data based on a first listen interval negotiated with the access point during establishment of the association;
    means for renegotiating with the access point for a modified listen interval without disassociating with the access point, wherein the means for renegotiating with the access point for the modified listen interval comprises means for sending a request for a second listen interval to the access point, means for receiving a denial of the second listen interval from the access point, and means for continuing negotiation with the access point after the denial until a suitable listen interval is selected and accepted; and
    means for receiving data based on the modified listen interval after the renegotiation.

12. A non-transitory processor-readable medium including instructions stored thereon, comprising:
    a first instruction set for establishing an association with an access point;
    a second instruction set for receiving data based on a first listen interval negotiated with the access point during establishment of the association;
    a third instruction set for renegotiating with the access point for a modified listen interval without disassociating with the access point, wherein renegotiating with the access point for the modified listen interval comprises sending a request for a second listen interval to the access point, receiving a denial of the second listen interval from the access point, and continuing negotiation with the access point after the denial until a suitable listen interval is selected and accepted; and a fourth instruction set for receiving data based on the modified listen interval after the renegotiation.

13. An apparatus comprising:
a processor configured to establish an association for a station, to send data to the station based on a first listen interval negotiated with the station during establishment of the association, to renegotiate with the station for a modified listen interval without disassociating the station, and to send data to the station based on the modified listen interval after the renegotiation; and
a memory coupled to the processor;
wherein renegotiating with the station for the modified listen interval comprises receiving a request for a second listen interval from the station, denying the request for the second listen interval, and continuing negotiation with the station after the denial until a suitable listen interval is selected and accepted.

14. The apparatus of claim 13, wherein the processor is configured to establish states for the station during the establishment of the association and to retain the states for the station during the renegotiation for the modified listen interval.

15. An apparatus comprising:
a processor configured to establish an association with an access point, to receive a communication from the access point that identifies an association timeout for the access point, and to become active at least once in every association timeout to keep the association with the access point alive; and
a memory coupled to the processor;
wherein the association timeout is a defined period of time transmitted in a beacon or unicast frame, wherein the access point disassociates a station if the access point does not detect any activity from the station for the defined period of time, and further wherein the station is reassociated after disassociation.

16. The apparatus of claim 15, wherein the communication is a beacon sent by the access point, and wherein the processor is configured to obtain the association timeout from the beacon.

17. The apparatus of claim 15, wherein the communication is a frame sent by the access point, and wherein the processor is configured to obtain the association timeout from the received frame.

18. The apparatus of claim 15, wherein the processor is configured to negotiate with the access point for a listen interval during the establishment of the association and to sleep for a period longer than the listen interval.

19. The apparatus of claim 15, wherein the processor is configured to negotiate with the access point for a listen interval during the establishment of the association and to sleep for a period longer than the listen interval without informing the access point.

20. A method comprising:
establishing an association with an access point;
receiving a communication from the access point that identifies an association timeout for the access point; and
becoming active at least once in every association timeout to keep the association with the access point alive;
wherein the association timeout is a defined period of time transmitted in a beacon or unicast frame, wherein the access point
disassociates a station if the access point does not detect any activity from the station for the defined period of time, and further wherein the station is reassociated after disassociation.

21. The method of claim 20, wherein the communication is a beacon sent by the access point, and further comprising obtaining the association timeout from the beacon.

22. The method of claim 20, further comprising:
negotiating with the access point for a listen interval during the establishment of the association; and
sleeping for a period longer than the listen interval.

23. An apparatus comprising:
means for establishing an association with an access point;
means for receiving a communication from the access point that identifies an association timeout for the access point; and
means for becoming active at least once in every association timeout to keep the association with the access point alive;
wherein the association timeout is a defined period of time transmitted in a beacon or unicast frame, wherein the access point
disassociates a station if the access point does not detect any activity from the station for the defined period of time, and further wherein the station is reassociated after disassociation.

24. A non-transitory processor-readable medium including instructions stored thereon, comprising:
a first instruction set for establishing an association with an access point;
a second instruction set for receiving a communication from the access point that identifies an association timeout for the access point; and
a third instruction set for becoming active at least once in every association timeout to keep the association with the access point alive;
wherein the association timeout is a defined period of time transmitted in a beacon or unicast frame, wherein the access point
disassociates a station if the access point does not detect any activity from the station for the defined period of time, and further wherein the station is reassociated after disassociation.

25. An access point comprising:
a processor configured to establish an association for a station, to send a communication to the station that indicates an association timeout supported by the access point, and to receive from the station at least one transmission in every association timeout to keep the association alive; and
a memory coupled to the processor;
wherein the association timeout is a defined period of time transmitted in a beacon or unicast frame, wherein the access point
disassociates the station if the access point does not detect any activity from the station for the defined period of time, and further wherein the station is reassociated after disassociation.

26. The apparatus of claim 25, wherein the processor is configured to send the association timeout in a beacon or a frame to the station.

27. A method, comprising:
establishing an association for a station;
sending data to the station based on a first listen interval negotiated with the station during establishment of the association;
renegotiating with the station for a modified listen interval without disassociating the station, wherein renegotiating with the station for the modified listen interval comprises:

receiving a request for a second listen interval from the station;
denying the request for the second listen interval; and
continuing negotiation with the station after the denial until a suitable listen interval is selected and accepted; and
sending data to the station based on the modified listen interval after the renegotiation.

28. The method of claim 27, further comprising:
establishing states for the station during the establishment of the association; and
retaining the states for the station during the renegotiation for the modified listen interval.

29. The method of claim 27, wherein the suitable listen interval is the modified listen interval.

30. An apparatus comprising:
means for establishing an association for a station;
means for sending data to the station based on a first listen interval negotiated with the station during establishment of the association;
means for renegotiating with the station for a modified listen interval without disassociating the station, wherein the means for renegotiating with the station for the modified listen interval includes:
means for receiving a request for a second listen interval from the station;
means for denying the request for the second listen interval; and
means for continuing negotiation with the station after the denial until a suitable listen interval is selected and accepted; and
means for sending data to the station based on the modified listen interval after the renegotiation.

31. The apparatus of claim 30, wherein the suitable listen interval is the modified listen interval.

32. A non-transitory processor-readable medium including instructions stored thereon, comprising:
a first instruction set for establishing an association for a station;
a second instruction set for sending data to the station based on a first listen interval negotiated with the station during establishment of the association;
a third instruction set for renegotiating with the station for a modified listen interval without disassociating the station, wherein renegotiating with the station for the modified listen interval comprises:
receiving a request for a second listen interval from the station;
denying the request for the second listen interval; and
continuing negotiation with the station after the denial until a suitable listen interval is selected and accepted; and
a fourth instruction set for sending data to the station based on the modified listen interval after the renegotiation.

33. The non-transitory processor-readable medium of claim 32, wherein the suitable listen interval is the modified listen interval.

34. A method comprising:
establishing an association between an access point and a station;
sending a communication from the access point to the station, wherein the communication identifies an association timeout supported by the access point, and wherein the association timeout is a period of time;
maintaining the association when at least one transmission is received at the access point from the station during the period of time; and
disassociating the station when the access point does not detect any activity from the station during the period of time.

35. The method of claim 34, wherein the communication is a beacon signal, and wherein the station obtains the association timeout from the beacon signal.

36. The method of claim 34, wherein the communication includes a frame, and wherein the station obtains the association timeout from the frame.

37. An apparatus comprising:
means for establishing an association between an access point and a station;
means for sending a communication from the access point to the station, wherein the communication identifies an association timeout supported by the access point, and wherein the association timeout is a period of time transmitted in a beacon or unicast frame;
means for maintaining the association when at least one transmission is received at the access point from the station during the period of time; and
means for disassociating the station when the access point does not detect any activity from the station during the period of time, and further wherein the station is reassociated after disassociation.

38. The apparatus of claim 37, wherein the communication is a beacon signal, and wherein the station obtains the association timeout from the beacon signal.

39. The apparatus of claim 37, wherein the communication includes a frame, and wherein the station obtains the association timeout from the frame.

40. A non-transitory processor-readable medium including instructions stored thereon, comprising:
a first instruction set for establishing an association between an access point and a station;
a second instruction set for sending a communication from the access point to the station, wherein the communication identifies an association timeout supported by the access point, and wherein the association timeout is a period of time transmitted in a beacon or unicast frame;
a third instruction set for maintaining the association when at least one transmission is received at the access point from the station during the period of time; and
a fourth instruction set for disassociating the station when the access point does not detect any activity from the station during the period of time, and further wherein the station is reassociated after disassociation.

41. The non-transitory processor-readable medium of claim 40, wherein the communication is a beacon signal, and wherein the station obtains the association timeout from the beacon signal.

42. The non-transitory processor-readable medium of claim 40, wherein the communication includes a frame, and wherein the station obtains the association timeout from the frame.

* * * * *